United States Patent [19]

Carr, Jr.

[11] Patent Number: 4,973,874
[45] Date of Patent: Nov. 27, 1990

[54] ELECTRICAL GENERATION FROM LOW-TEMPERATURE HEAT SOURCES AND FLUX PUMP

[76] Inventor: Walter J. Carr, Jr., 1460 Jefferson Hts., Pittsburgh, Pa. 15235

[21] Appl. No.: 157,486

[22] Filed: Feb. 18, 1988

[51] Int. Cl.$^5$ .......................... H02N 3/00; H02K 1/00
[52] U.S. Cl. .................................... 310/306; 361/321; 505/705
[58] Field of Search .......................... 310/10, 306, 52; 307/419; 361/321; 505/705

[56] References Cited

U.S. PATENT DOCUMENTS 4,599,677  7/1986  Lawless et al. ...................... 361/321

FOREIGN PATENT DOCUMENTS 2623767  12/1977  Fed. Rep. of Germany ...... 310/306

OTHER PUBLICATIONS van de Klundert et al., "Fully Superconducting Rectifiers and Flux Pumps, Part 1," *Cryogenics*, vol. 21, pp. 195–204, Apr. 1981.

*Primary Examiner*—Steven L. Stephan
*Assistant Examiner*—D. L. Rebsch

[57] ABSTRACT

A method and flux pump for inducing electrical energy from superconducting and ferromagnetic material comprising initially magnetizing said ferromagnetic material, and applying heat to raise the ferromagnetic material above its magnetic transition temperature, so as to cause a loss of magnetization and induce a current in a superconducting circuit.

3 Claims, 2 Drawing Sheets

ELECTRICAL GENERATION FROM LOW-TEMPERATURE HEAT SOURCES AND FLUX PUMP

DESCRIPTION

1. Technical Field

The invention is directed to the provision and use of superconducting circuits enclosing a magnetized ferromagnetic material which can generate electrical power from low-temperature heat sources and store it until needed.

2. Background of Invention

A superconducting energy store allows magnetic energy to be built up in a superconducting coil over a relatively long period of time in order to be released rapidly into a load. One means for building up the energy is a flux pump which in its usual form consists of an air core transformer in which the output is rectified and connected to the superconducting coil. (See L. J. M. Van de Klundert and H. H. J. Ten Kate, *Cryogenics*, Vol. 21, 195–204 [1981].) Since the whole circuit must be superconducting, ordinary diodes cannot be used for the rectification. Rectification is obtained by opening and closing superconducting switches, which can be done without producing heat if the switches are opened at a time of zero current. Two or more switches are required. A superconducting switch corresponds to a short section of a superconducting circuit which is driven from its superconducting to its normal state by means of heat or a magnetic field. Typically it is a short length in a long wire, but such a switch can also be a two dimensional element in a superconducting surface that carries current. As ordinarily used energy is fed into the primary side of the transformer from an electrical power source in order to change the flux. In the invention to be described here the electrical power supply and the primary winding of the air core transformer are eliminated. Ferromagnetic material is placed inside the circuit and the flux is changed by means of heat.

Vast quantities of heat exist on the earth's surface at temperatures too small above ambient to be useful for generating electrical power by standard means. Nevertheless, this heat is free, and therefore can be used even at very low thermal efficiency, provided the conversion to electrical power can be done cheaply enough. A new concept is proposed for doing so, which makes use of the properties of ferromagnets and superconductors.

Disclosure of Invention

It has now been discovered that this heat at ambient temperature can be utilized in a novel flux pump and method whereby electrical energy can be generated and stored cheaply until needed. Briefly, the invention comprises the use of ferromagnetic material in combination with a superconducting coil, with the ferromagnetic material initially magnetized. Heat is then applied to carry the material above its transition or Curie temperature, causing the loss of magnetization. The superconducting circuit prevents a change of flux so that a current is induced such that the flux due to the current is equal to the flux of the lost magnetization. To keep the volume and cost of the ferromagnetic material low, only a small amount of ferromagnetic material is used, and the magnetic energy is built up in steps using the known principle of flux pumps (Klundert et al., supra). The flux pump is operated by alternately heating and cooling the ferromagnetic material wherein switches are used to connect the circuit enclosing the ferromagnetic material to the storage coil during the heating part of the cycle and to disconnect the storage coil during the cooling part of the cycle. At the end of the cooling cycle, means are used to remagnetize the ferromagnetic material. A permanent magnet or dc magnetizing coil placed around the ferromagnetic material may be used. Magnetic energy now exists in a readily usable form. Thus the system acts as a heat engine, where heat is transformed into magnetic energy which can be stored in a second superconducting coil until such time as its use is demanded. To extract the energy, a load may be inserted into the storage superconducting circuit by means of switches. Depending on the resistance and inductance of the system, the energy can be extracted quite slowly or very rapidly. Some applications of interest are: (1) for increasing the peak power of an electrical system over a short fraction of a day, or (2) for producing a very large burst of power over a very short period of time. Because of the absence of resistance in the superconducting coil, the flux can be pumped up over any arbitrary period of time. Thus the energy stored in the coil can result from a low level of input heat over a relatively long period of time. When used in this way the device combines the features of an energy storage device with the features of a primary heat engine, having the added advantage that waste heat can be used as the primary source of the energy.

MODES FOR CARRYING OUT INVENTION

Figure 1:
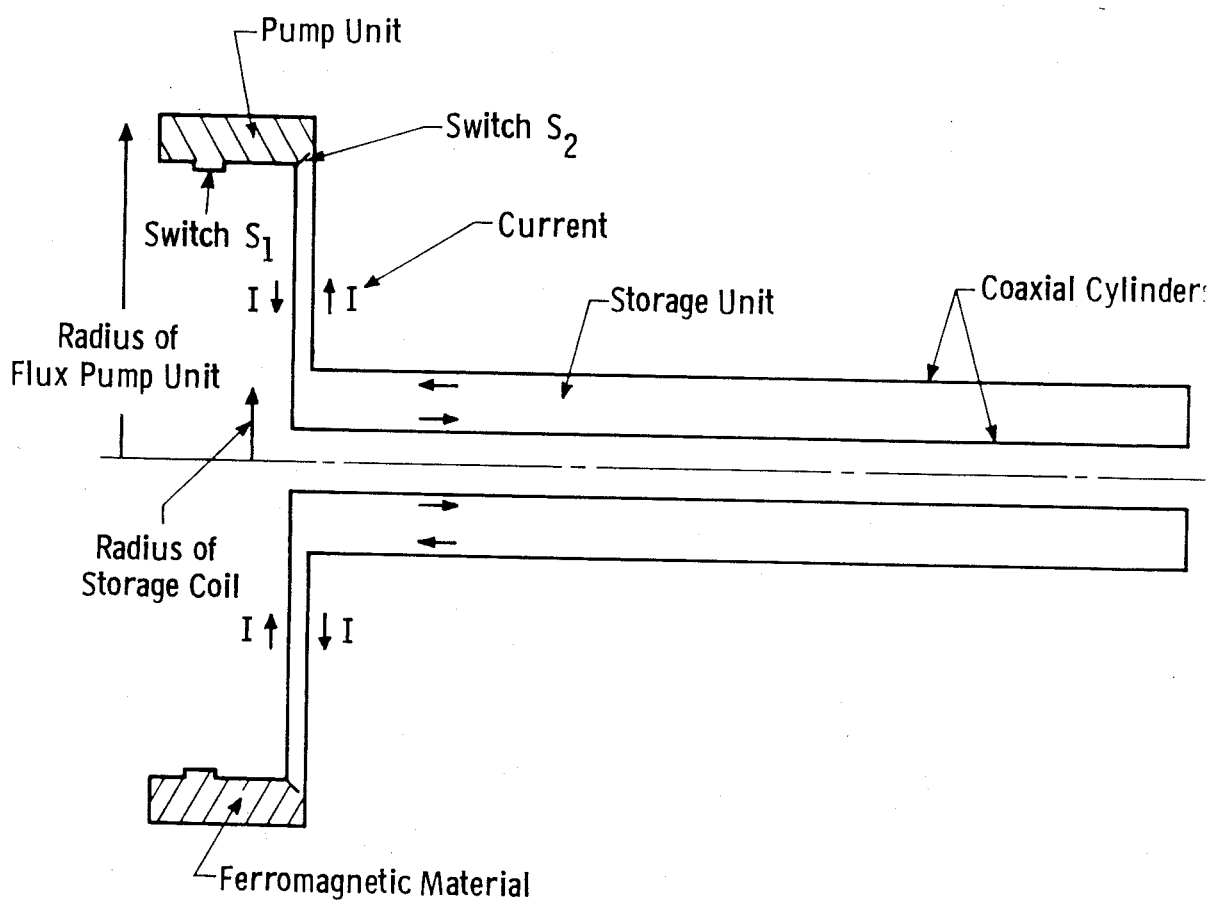
FIG. 1 is a schematic of a flux pump and storage unit with one turn.

Referring now to the drawings, one embodiment of the invention is shown in FIG. 1 with a coil which simply consists of two concentric cylinders 1 which support a thin layer of superconductor on the two surfaces. The ends of the cylinders are closed to give a closed superconducting path. At one end the cylinders have a larger diameter over a short length as shown on the left-hand side. The space between the cylinders in the short length having the larger diameters is filled with ferromagnetic material, where the Curie temperature is chosen to be near the desired operating point, or preferably near room temperature. Ducts are provided in the ferromagnetic material for heating and cooling fluids to flow. Residual induction, or alternatively a small magnetizing coil around the ferromagnet, give the material its initial magnetization. A warm fluid heated from the primary heat source is then circulated through the ferromagnetic material. The heat source can be warm water from the ocean, solar heat, rejected heat from a large power plant, etc. The temperature of the ferromagnet is changed a small amount, whereby both the flux of the ferromagnet is changed and a current induced in the superconductor. Two switches $S_1$ and $S_2$ are indicated in FIG. 1, where these switches simply correspond to weak links in the superconducting path which can be driven normal by the application of heat, a magnetic field, additional current, or strain. The switches are opened and closed at zero current, in a sequence of steps described by Klundert and Kate (supra).

EXAMPLE.

The efficacy of the invention can be illustrated by the use of a superconductor such as niobium titanium or niobium tin bathed in helium or copper oxide ceramics bathed in nitrogen and a ferromagnetic material such as Gadolinium in a device such as illustrated in the drawing. In a circuit having a length of $10^3$ meters, several hundred megawatts of power can be obtained over a period of an hour. For much smaller circuits, enormous bursts of power can be obtained over a very short interval of time.

Figure 2:
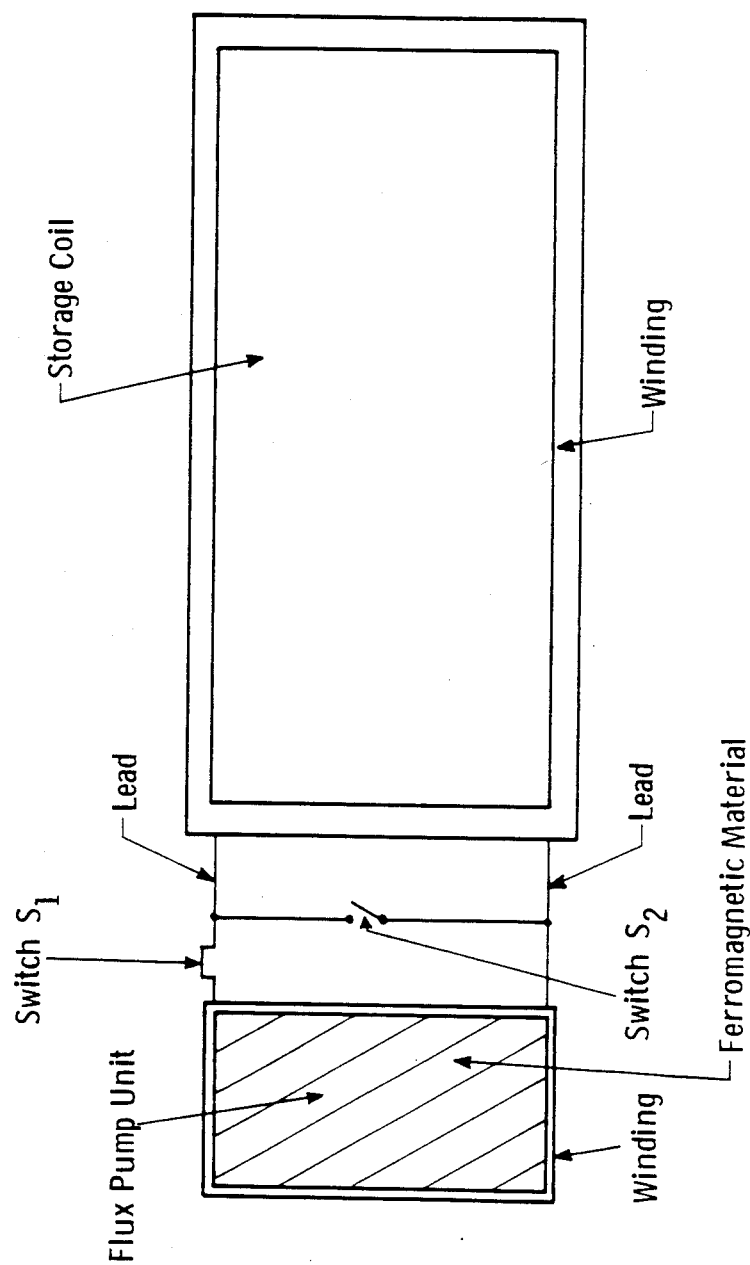
FIG. 2 is a schematic of a flux pump and storage unit with many turns.

In FIG. 2 an alternate embodiment more suited to supplying energy to a system over a relatively long period of time is shown. In this embodiment energy is stored in a toroidal superconducting coil 1. At a point along the coil two leads (2 and 3) are brought out and connected to superconducting switches $S_1$ and $S_2$ as shown. A smaller toroidal coil 4 filled with a magnetized ferromagnetic material can be connected to the main storage coil via switches $S_1$ and $S_2$. If the two coils are connected in series and the magnetization of the ferromagnetic material is destroyed by heat, current is induced in the storage coil. The current is then increased in steps by the flux pump principle. Suitable ferromagnets can be formed from Gd, 30% Ni—Fe, and MnAs. Superconductors which can be employed include both those cooled by helium and by nitrogen. Examples of the former include NbTi and Nb$_3$Sn. Examples of the latter include yBa$_2$Cu$_3$O$_{7-x}$.

While the invention has been illustrated by the use of alternate embodiments, numerous but obvious variations may occur to one of ordinary skill, and accordingly the invention is intended to be limited only by the appended claims.

What is claimed is:

1. A flux pump operated as a heat activated flux pump wherein a ferromagnetic material is contained within a superconducting circuit of said pump and said material is alternately heated and cooled, with switches used to connect the circuit enclosing the ferromagnetic material in series with a superconducting storage coil during the heating part of the cycle, and to disconnect the storage coil by opening the series circuit and short-circuiting the storage coil during the cooling part of the cycle, while the ferromagnetic material is remagnetized during the cooling, wherein the number of turns in the superconductor energy storage coil is increased enough to make the magnetic field of the energy storage coil from about 2 to 10 times larger than the magnetic field produced by the same current in the circuit enclosing the ferromagnetic material.

2. A heat activated flux pump consisting of a single turn storage coil where the circuit of said turn consists of the surface enclosing the volume between two coaxial cylinders, closed on the ends, where said surface is coated with a superconducting film, and where a ferromagnetic ring occupies the volume of another similar set of coaxial cylinders, where two or more superconducting switches are used to connect or disconnect the said section with the ferromagnetic ring to the storage section.

3. The method of claim 2 wherein the coaxial cylinders of the section containing said ferromagnetic ring have a radius from about 2 to 10 times larger than the storage coaxial cylinders.

* * * * *